United States Patent
Chen et al.

(10) Patent No.: US 9,866,946 B2
(45) Date of Patent: Jan. 9, 2018

(54) WIRELESS HEADSET

(71) Applicant: Bose Corporation, Framingham, MA (US)

(72) Inventors: Louis Gwo-chung Chen, Bolton, MA (US); Eric Wallace, Andover, MA (US); Scott Perzanoski, Dudley, MA (US); Michael Ting, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/177,024

(22) Filed: Jun. 8, 2016

(65) Prior Publication Data

US 2017/0359645 A1     Dec. 14, 2017

(51) Int. Cl.
*H04R 1/10*     (2006.01)

(52) U.S. Cl.
CPC ......... *H04R 1/1066* (2013.01); *H04R 1/1075* (2013.01)

(58) Field of Classification Search
CPC  H04S 7/304; H04S 7/307; H04R 3/00; H04R 1/02; H04R 2201/103; H04R 1/1008; H04R 2201/109; H04R 2225/51
See application file for complete search history.

(56) References Cited

U.S. PATENT DOCUMENTS

| | | | |
|---|---|---|---|
| 5,841,858 A * | 11/1998 | Frierson | H04M 1/0202 379/428.02 |
| 5,887,066 A | 3/1999 | Nakagawa | |
| 6,259,416 B1 | 7/2001 | Qi et al. | |
| 6,356,773 B1 * | 3/2002 | Rinot | H01Q 1/245 2/171 |
| 2004/0150570 A1 * | 8/2004 | Yuasa | H01Q 1/273 343/702 |
| 2005/0266875 A1 | 12/2005 | Yegin et al. | |
| 2006/0193487 A1 | 8/2006 | Mok et al. | |
| 2009/0195479 A1 | 8/2009 | Kato et al. | |

FOREIGN PATENT DOCUMENTS

| | | |
|---|---|---|
| CN | 205657821 U | 10/2016 |
| EP | 2887693 A1 | 6/2015 |
| FR | 2453549 A1 | 10/1980 |
| JP | H08125614 A | 5/1996 |
| JP | H118893 A | 1/1999 |
| WO | 89/02679 A1 | 3/1989 |

OTHER PUBLICATIONS

The International Search Report and the Written Opinion of the International Searching Authority dated Aug. 25, 2017 for PCT Application No. PCT/US2017/036497.
Yuma Ono, et al: "Development of Compact Wearable Antenna"; Wireless Information Technology and Systems (ICWITS), 2012 IEEE International Conference on, IEEE, Nov. 11, 2012 (Nov. 11, 2012), pp. 1-4, XP032312394, DOI: 10.1109/ICWITS.2012.6417679; ISBN: 978-1-4673-0947-9.

* cited by examiner

*Primary Examiner* — Mohammad Islam
(74) *Attorney, Agent, or Firm* — Brian M. Dingman; Dingman IP Law, PC

(57) ABSTRACT

A wireless headset with a headband that is constructed and arranged to fit over a user's head. The headband includes an antenna that is adapted to transmit and receive wireless signals, and electronic signal processing hardware that is electrically matched to the antenna. The headset also includes earcups carried by the headband, each earcup arranged to sit on, over or near one ear of the user. Each earcup has an audio transducer.

20 Claims, 6 Drawing Sheets

WIRELESS HEADSET

BACKGROUND

This disclosure relates to a wireless headset.

Wireless headsets have an antenna that exchanges wireless signals with another wireless source device. The antenna is commonly located in an earcup. Earcups are relatively small but need to include basic elements such as an acoustic cavity, one or more transducers, electronic components as well as other enhanced features such as microphones and sensors. The presence of an antenna in an earcup thus occupies valuable space that could be used for other system components.

In some cases, wireless source devices can be smartphones or other small electronic devices that are carried in a pocket or perhaps in a hand. The presence of the human body between the wireless source device and the headset has an effect on the wireless link quality. Antenna design and location can be improved so as to improve signal reception.

SUMMARY

Wireless headsets have a headband that is constructed and arranged to fit over a user's head. The headband of the present headset includes one or more antennas that are adapted to send and receive wireless signals; the antenna(s) can be integrally formed as part of the metallic support structure of the headband. The headband may also include electronic signal processing hardware that is electrically matched to the antenna.

All examples and features mentioned below can be combined in any technically possible way.

In one aspect, a wireless headset includes a headband that is constructed and arranged to fit over a user's head, wherein the headband comprises an antenna that is adapted to transmit and receive wireless signals. The headband also includes electronic signal processing hardware that is electrically matched to the antenna. First and second earcups are carried by the headband, each earcup arranged to sit on, over or near one ear of the user, each earcup comprising an audio transducer.

Embodiments may include one of the following features, or any combination thereof. The headband may comprise a metal support structure, and the antenna may be an integral part of the metal support structure. The antenna may be a slotted loop structure. The headband may have a center located approximately equidistantly from the earcups, and at least one of the antenna and the electronic signal processing hardware may be located between the center and one earcup. The electronic signal processing hardware may include radio electronics.

Embodiments may include one of the following features, or any combination thereof. The headband may have two or more distinct antennas. The headband may include a metal support structure, and two or more antennas may be an integral part of the metal support structure. The antenna may have a radiation efficiency, defined as total radiated power divided by total input power when measured on a body or a proxy, and the radiation efficiency may be greater than 50%. In an example, the radiation efficiency of the antenna is about 75% when measured on a body or a proxy.

Embodiments may include one of the following features, or any combination thereof. When the headband is worn on the head the antenna may have dominant horizontal polarization referenced to the surface of the human body, and may exhibit low signal attenuation in the propagating path toward the source device along the front and back sides of the user's body. When the headband is worn on the head the antenna may exhibit such a polarization, as the signal travels along a surface of the user's body, that it reduces scattering of the signal and so reduces signal attenuation in a propagating path toward ground along the sides of the user's body. The headband may be relatively flat, and curved such that it generally follows a contour of the head across the crown of the head between the user's ears, and the antenna may be generally flat and generally follow the curve of the headband.

Embodiments may include one of the following features, or any combination thereof. The electronic signal processing hardware may be carried by a printed circuit board. The antenna may be a slotted loop structure. The headband may have a metal support structure, and the slotted loop structure may include a slot in the metal support structure. The slot may have two sides. The printed circuit board may be electrically matched to the metal support structure proximate each side of the slot.

In another aspect a wireless headset includes a headband that is constructed and arranged to fit over a user's head, wherein the headband comprises a metal support structure, and an antenna that is an integral part of the metal support structure and is adapted to transmit and receive wireless audio signals. The antenna has a radiation efficiency, defined as total radiated power divided by total input power, of greater than 50% when measured on a body or a proxy. There is also electronic signal processing hardware that is electrically matched to the antenna. First and second earcups are carried by the headband, each earcup arranged to sit on, over or near one ear of the user, each earcup comprising an audio transducer.

Embodiments may include one of the following features, or any combination thereof. The electronic signal processing hardware may be carried by a printed circuit board. The antenna may be a slotted loop structure. The headband may have a metal support structure. The slotted loop structure may comprise a slot in the metal support structure, where the slot has two sides. The printed circuit board may be electrically matched to the metal support structure proximate each side of the slot. When the headband is worn on the head the antenna may have dominant horizontal polarization referenced to the surface of the human body, and may exhibit a polarization that causes a signal to travel along a surface of the user's body, which reduces scattering of the signal and so reduces signal attenuation in the propagating path toward the source device along the front and back sides of the user's body.

In another aspect a wireless headset includes a headband that is constructed and arranged to fit over a user's head, wherein the headband includes a generally flat metal support structure that generally follows a curve of the headband, and a slotted loop antenna that is an integral part of the metal support structure and comprises a loop and a slot in the metal support structure. The antenna is adapted to transmit and receive wireless audio signals and has a radiation efficiency, defined as total radiated power divided by total input power, of greater than 50% when measured on a body or a proxy. The headband also includes electronic signal processing hardware that is carried by a printed circuit board that is electrically matched to the metal support structure proximate the slot. First and second earcups are carried by the headband, each earcup arranged to sit on, over or near one ear of the user, each earcup comprising an audio transducer.

DETAILED DESCRIPTION

A headset refers to a device that fits around, on, or in an ear, or in the vicinity of an ear, and that radiates acoustic energy into the ear canal. Headsets are sometimes referred to as earphones, earpieces, headphones, earbuds or sport headphones, and can include a wired or wireless connection to an audio source. A headset includes an acoustic driver to transduce audio signals to acoustic energy. The acoustic driver may be housed in an earcup or earbud. A headset may have a single stand-alone headphone or be one of a pair of headphones (each including a respective acoustic driver and earcup), one for each ear. The earcups/earbuds of a headset may be connected mechanically, for example by a headband and/or by leads that conduct audio signals to an acoustic driver in the headphone, or they may be completely wireless. A headset may include components of an active noise reduction (ANR) system, but is not limited thereto. A headset may also include other functionality such as a communications microphone so that it can function as a communication device.

A headset can be configured to connect to another device such as a phone, media player, or transceiver device via one or more connecting wires or cables. In some implementations, the headset may be wireless, e.g., there may be no wire or cable that mechanically or electronically couples the earpiece to any other device (though there may be a wire or cable that mechanically or electronically couples the earpieces). In such cases, the headset can include a wireless transceiver module capable of communicating with another device such as a mobile phone or transceiver device using, for example, a media access control (MAC) protocol such as Bluetooth®, IEEE 802.11, or another local area network (LAN) or personal area network (PAN) protocol.

The wireless headset described herein has an antenna located in the headband. Part or all of the antenna can be an integral part of the metal support structure of the headband. The antenna can be a separate component that is carried by or within the headband. The antenna can exhibit a dominant polarization, referenced to the surface of the human body, that is advantageous for signal propagation in the path toward the worn source device along the body surface. The polarization may in turn reduce signal scattering and subsequently enable less signal attenuation toward the source device in the pocket either on the front or the back of the user's body. These features accomplish an antenna that is highly efficient, and is effective for transmission and reception of wireless signals from a portable audio device that is carried on the person of the wearer of the headset. The headset preferably also includes electronic signal processing hardware that is electrically matched to the antenna.

Figure 1:
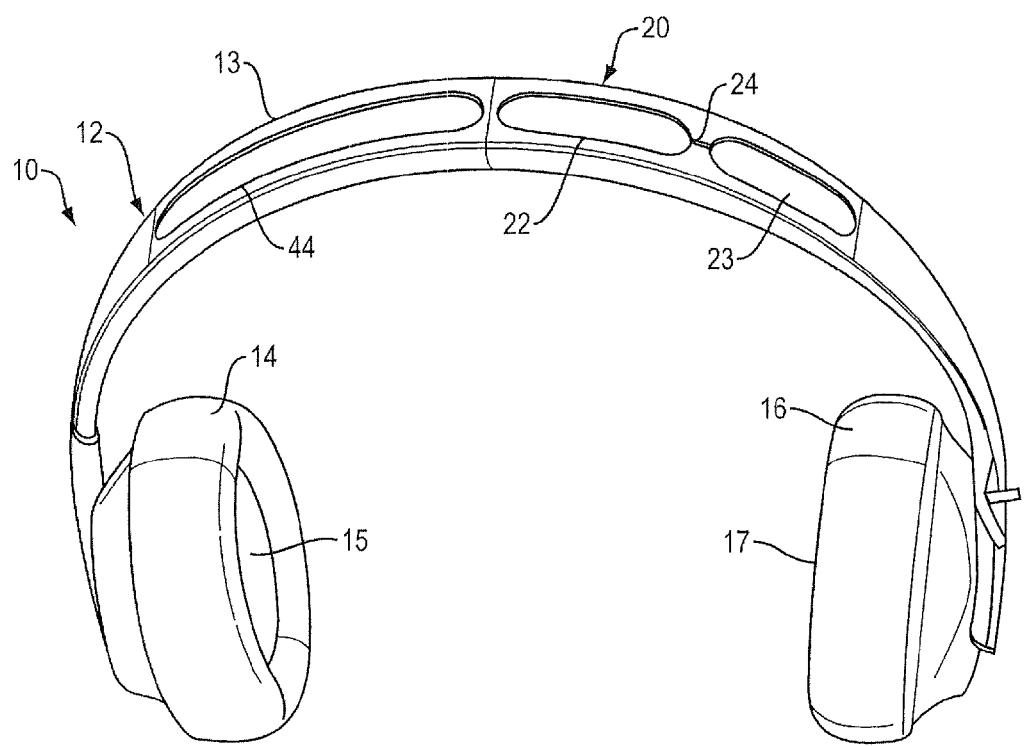
FIG. 1 is a top perspective view of a wireless headset.

A wireless headset 10 of the present disclosure, FIG. 1, has a headband 12 that is constructed and arranged to fit over a user's head. Headset 10 also includes earcups 14 and 16 that are carried at or near the ends of headband 12. Earcups 14 and 16 are each arranged to sit on, over or near one ear of the user. Earcup 14 includes audio transducer 15 and earcup 16 includes audio transducer 17. One or both earcups may also include other hardware (not shown) such as microphones (e.g., for use in noise reduction), processors (e.g., for audio signal processing and noise reduction signal processing) and batteries; the electronic hardware used in wireless headsets is generally known in the field and so is not further described herein.

Headband 12 includes an antenna 20 that is adapted to transmit and receive wireless signals. Headband 12 further includes electronic signal processing hardware (not shown in FIG. 1) that is electrically matched to antenna 20. Headband 12 may be relatively flat, and curved such that it generally follows a contour of the head across the crown of the head between the user's ears, and the antenna may be generally flat and generally follow the curve of the headband. In this non-limiting example, headband 12 includes an internal and generally thin, flat, curved metal support structure 13, and antenna 20 is an integral part of metal support structure 13. Support structure 13 may generally follow the curve of headband 12. Headband 12 typically includes other features such as cushions and sliders that are known in the art and that are not depicted in the drawings, simply for the sake of clarity. Although several types of antennas can be used in the headset, antenna 20 may be a slotted loop structure defined by loop 22 and slot 24. Antenna 20 preferably but not necessarily generally exhibits a pronounced polarization pattern that is advantageous to allow signals to propagate in the path toward the source device along the contour of the human body when headband 12 is worn on the head, as is explained in more detail below.

Figure 2:
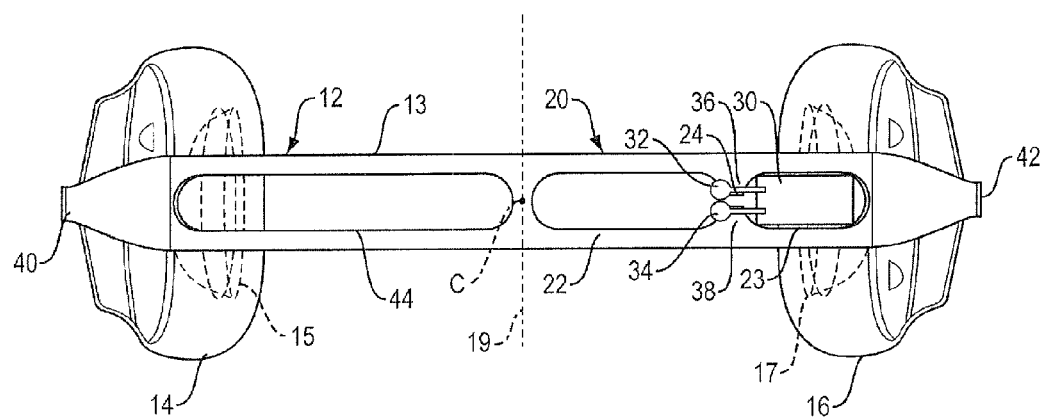
FIG. 2 is a top view of the wireless headset of FIG. 1.

As shown in FIG. 2, headband 12 further includes electronic processing hardware 30. Hardware 30 is electrically matched to antenna 20, for example with transmission lines 32 and 34 that are terminated in portions 36 and 38 of metal support structure 13 that are adjacent to slot 24. Hardware 30 preferably includes one or more electronic signal processing components, such as the radio electronics that are involved in the transmission and reception of wireless signals and an audio processor that is involved with converting and processing coded wireless payload signals to audio signals. Hardware 30 may comprise a flexible or partially flexible printed circuit board (PCB) with one or more of such electronic components and potentially other digital or analog components mounted on it. The PCB may be mounted within oval-shaped cutout 23 as depicted in FIG. 2, or the PCB may be carried elsewhere within the headband. Support structure 13 may also include additional generally oval-shaped cutout 44 to reduce the overall weight of the structure. Metal support structure 13 may have additional openings or cutouts (not shown) to further reduce the weight of the structure.

As further shown in FIG. 2, headband 12 may have a center "C" that is on the headband's transverse bisecting axis 19; axis 19 is located approximately equidistantly from ends 40 and 42 of support structure 13. Earcups 14 and 16 are matched to ends 40 and 42 in a manner that is known in the field and so is not further described herein. Antenna 20 is accomplished by a generally oval-shaped cutout (loop) 22 in structure 13, together with slot 24. Antenna 20 and/or the associated electronic processing hardware 30 are preferably but not necessarily entirely located on one side of the headband, between the center C and one earcup, as depicted in FIG. 2. The location of antenna 20 is considered due to both the desirable antenna performance and the physical location of electronic processing hardware 30. Due to bending and torsion of the headband, electronic hardware may be damaged by mechanical distortion. Placing hardware 30 off-center will subject it to less bending and torsion. Prioritizing the location of the electronic hardware may thus produce a more robust headband design.

By moving the antenna structure out of an earcup into the headband, the antenna design is no longer constrained by the earcup volume. Due to a relatively large surface area of a headband, more antenna configurations can be accomplished, leading to performance advantages. In addition, by implementing radio electronics and/or other electronic/electrical signal processing components in the headband adjacent to the antenna structure, the antenna-to-electronics interface/connectivity can be simplified both in terms of performance and cost. This also frees additional earcup volume for other components, or to provide more flexibility in the earcup design process.

By placing a cut-off slot (e.g., slot 24) into a metal headband support structure, a slotted loop antenna can be formed as an integral part of the headband. There are advantages for this implementation such as a large headband surface area to configure and optimize antenna performance, an increase of degrees of overall design freedom by moving an antenna out of an earcup, and a size reduction of earcups. In addition, the antenna can be electrically connected to electronics on, for example, a PCB. By implementing this PCB into the headband adjacent to the antenna, the antenna-to-PCB connectivity is simplified.

While a single antenna 20 is shown in FIGS. 1 and 2, a metal headband support (e.g., structure 13 in FIGS. 1 and 2) can house more than one antenna to support multiple types of wireless connectivity such as Bluetooth®, dual-band WiFi and/or global positioning systems (GPS); this is further explained below. Moreover, by moving the antenna and associated electronics to the headband, the earcup volume is freed up, and can house other electronics such as sensors, signal processors, on-board music storage memory and others. Furthermore, a headband with built-in radio capability can be mated with different earcups having different designs, features and functionalities, providing greater product design flexibility.

Figure 3A:
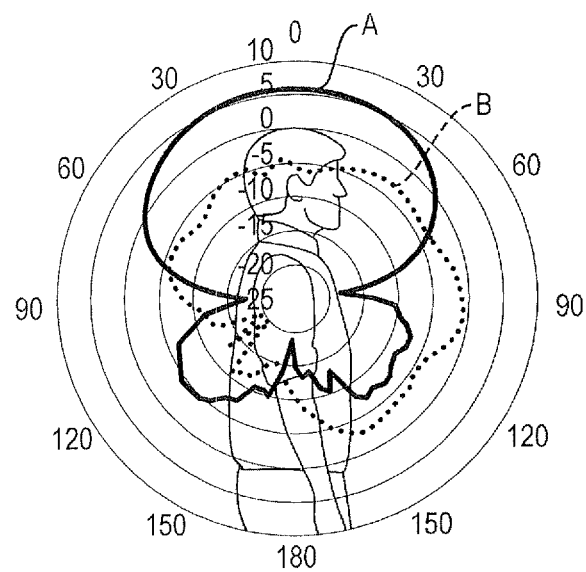
FIGS. 3A-3C illustrate radiation patterns of the antenna of FIGS. 1 and 2 in three orthogonal planes.
Figure 3B:
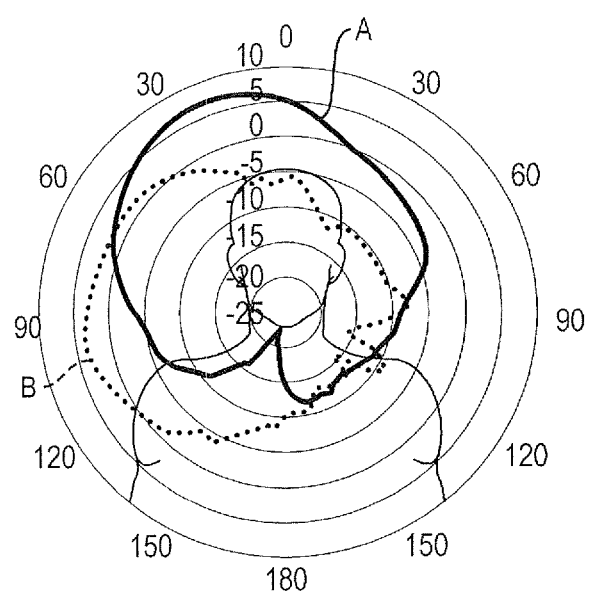
Figure 3C:
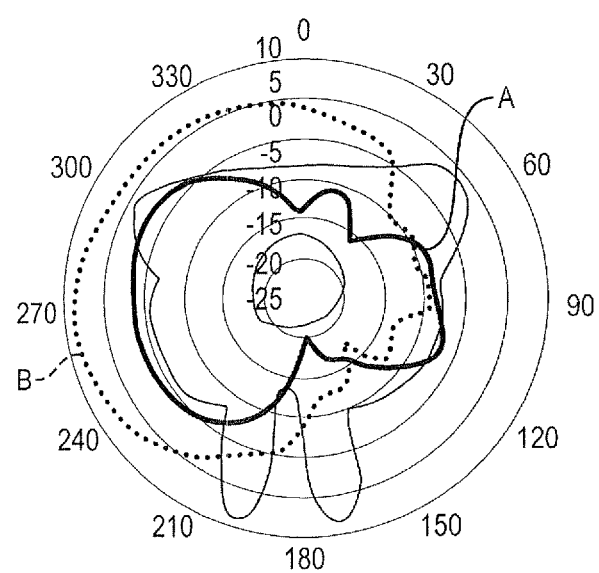

FIGS. 3A-3C illustrate radiation patterns of the antenna of FIGS. 1 and 2 (solid line loops labeled "A") in three orthogonal planes referenced to a human body, compared to a traditional (prior art) wireless headset antenna located in an earcup (dashed line loops labeled "B"); in the present case the prior art was a SoundLink® around-ear wireless headphones II available from Bose Corporation of Framingham, Mass., USA. FIG. 3A is the pattern in a vertical plane at a side of the person wearing the antenna (at angle phi=0). FIG. 3B is the pattern in a vertical plane in front of the person wearing the antenna (at angle phi=90 degrees). FIG. 3C is the pattern in a horizontal plane at the top of the head of the person wearing the antenna (at angle theta=0 degrees). These three planes are representative of three subsets of data conventionally used in the art. Although the three planes represent a subset of radiation performance, they can serve as standardized parameters to evaluate antenna far-field performance. Due to the presence of a human body, far-field radiation patterns are distorted compared to its conventional free space measurement.

According to the plots of FIGS. 3A-3C, antenna 20 yields stronger overall far-field radiation (the area of the enclosed loops labeled "A") for both Phi=0 and Phi=90 planes, but slightly weaker for Theta=90 (as compared to a prior art in-earcup antenna, labeled "B"). By integrating a complete set of data characterizing radiation performance, the total radiated power is derived. The result is that antenna 20 has an efficiency (defined as total radiated power divided by total input power when measured on a body or a proxy) that is greater than the roughly 50% efficiency of the prior art antenna; the efficiency can be roughly 75% when measured on a body or a proxy, or more. Accordingly, antenna 20 is noticeably superior to the prior art antenna from the far-field radiation performance point of view, as antenna efficiency is one parameter that influences far-field radiation performance.

When headband 12 is worn on the head, antenna 20 may have a dominant horizontal polarization, and may exhibit low signal attenuation in the propagating path toward ground along the front and back sides of the user's body. The headband is preferably relatively flat and thin as shown in FIGS. 1 and 2, and curved about axis 19 such that it generally follows a contour of the head across the crown of the head between the user's ears. As one non-limiting example the headband may have a length of about 468 mm and the slotted loop antenna may have a circumference of about 105 mm. Antenna 20 is preferably a low-profile antenna that is fully located within this flat headband. The antenna is in one case generally flat and generally follows the curve of the headband when the headband sits on the head. One type of antenna that is suitable for this application is a slotted loop antenna. However other types of antennas, including but not limited to monopole and dipole antennas or slotted antennas, may be used.

Conventional antenna performance evaluation is based on its far-field radiation parameters such as radiation efficiency, directivity and polarization. Those parameters are suitable in applications having two antennas (both transmitting and receiving) that are far apart in space. However, for wearable applications with two antennas co-located on a user's body and blocked by the body in terms of line of sight, those far-field parameters become un-deterministic. The reason is that the electromagnetic waves propagating between two on-body antennas scatter around the body, and the presence of the body alters the radiation characteristics of both antennas.

To properly characterize wearable antenna performance, rather than measuring the antenna's far-field parameters in free space as in the conventional manner, the antenna can be placed on a human body, or a proxy such as a phantom (mannequin). The presence of the body or proxy alters the antenna's boundary conditions then subsequently changes the antenna's far-field performance. The far-field parameters mentioned above are still useful in characterizing wearable applications because many use cases require signals to travel a long distance either directly through line-of-sight or indirectly through reflections off objects such as walls, ceilings, floors and the like to reach the receiving antenna. However, the modified far-field parameters as they are changed due to the presence of the body or a proxy are necessary, but not sufficient to fully characterize wearable applications.

A wearable antenna such as the antenna described herein can be characterized by what might be termed a "transmission coefficient," which can be defined as the ratio of the received signal strength to the transmitted signal strength between two on-body antennas. This can be viewed as the transmission efficiency between those two antennas on a user's body. Due to the highly scattering nature of electromagnetic waves around human bodies, the transmission coefficient is difficult to measure empirically or simulate numerically. A useful parameter for characterizing on-body antenna performance is polarization of the propagating signal around a user's body, especially at the skin surface. By utilizing antennas with a particular polarization, signals propagating along the surface contour of the body can be enabled. Such signals can be guided to the receiving antenna with reduced scattering. Less scattering of the signal generally produces less transmission loss.

To understand how different polarizations of an antenna signal travel around a human body, the signal behavior at the air-to-skin interface can be analyzed. By applying Maxwell's equations at the air-to-skin interface, a general form of electromagnetic propagation reveals that a signal with an electric field perpendicular to the skin interface yields a better penetration. On the other hand, if the signal's electric field is parallel to the interface, signals are prone to be reflected away from it. Fundamentally, if the signal is reflected away from the body, the signal path between two antennas on the body would be dominated by reflective paths from the surroundings. This configuration presents a challenge to a wireless link when a user is a vast open area such as a large outdoor parking lot with high path loss.

A wearable antenna with a dominant perpendicular electrical field to the air-to-skin interface has an advantage of penetrating its sent signal into the skin. Once the signal enters the skin, the next layer inward, whether it be muscle, fat or bones, presents another interface. The majority of the body's internal structures, such as fat, muscle, bone and organs, are very hard to penetrate due to their electrical properties (such as dielectric constant and loss tangent). Therefore, the majority of the signals are actually reflected away from the internal structures back toward the skin surface. The cascading effect of this repeated penetrating and reflecting mechanism at the surface layers of a human body produces a so-called "guiding" effect, which some in the industry call a "creeping wave," along the contour of the body's surface. Macroscopically, it is observed as if, instead of propagating at a straight line, the signal bends according to the body. This creeping wave enables the propagating signal to travel along the surface of human body from the transmitting antenna to the receiving antenna. As long as this path produces less loss than the reflecting-off-faraway path, this path would be the dominant (and preferable) propagation path. A good example would be for a user standing in a middle of a large open area with few objects nearby. Although the distance between a headset (e.g., on the user's head) and a smart phone (e.g., in the user's back pants pocket) is typically only about two feet, many wireless headset users encounter a poor audio streaming experience in these situations.

Figure 4:
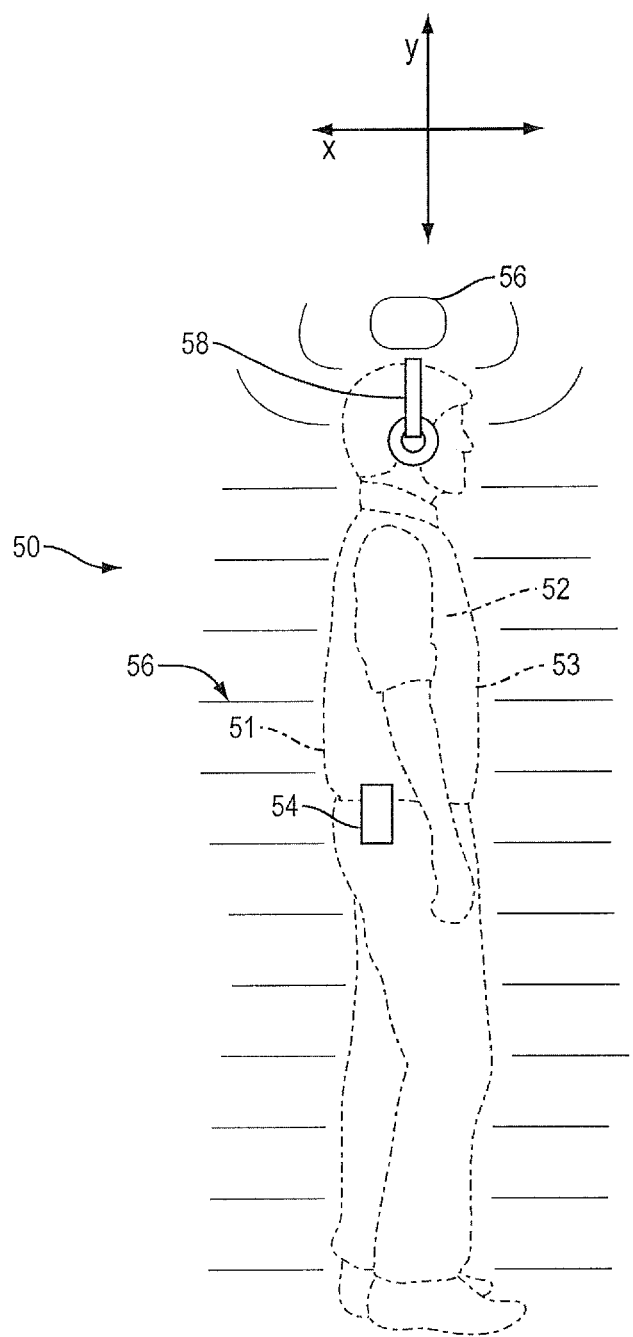
FIG. 4 illustrates the electrical field of the antenna of FIGS. 1 and 2 in a vertical plane bisecting the body of the wearer.

FIG. 4 illustrates a simulated 3D electrical field 50 mapped to a 2D vertical plane through the body 52, in a side view, with field lines 56 depicted. A typical back pants pocket location of smartphone 54 is indicated. Field 50 is for antenna 20, FIGS. 1 and 2, in headset 58 worn on the head. Plot 50 illustrates a fairly consistent electric field propagating along the back side 51 of the human body 52. The electrical field illustrated is the x-component, which constitutes the polarization that is perpendicular to the front and back of the wearer's body (the body is longitudinal in the y-axis). For a common use case of placing a smart phone in a user's back pocket with a headset on, the antenna 20 has about 10 dB greater electric field strength than the prior art configuration with the antenna in an earcup, in which the electric field is weaker and has scattering components that make it almost random in orientation.

Figure 5:
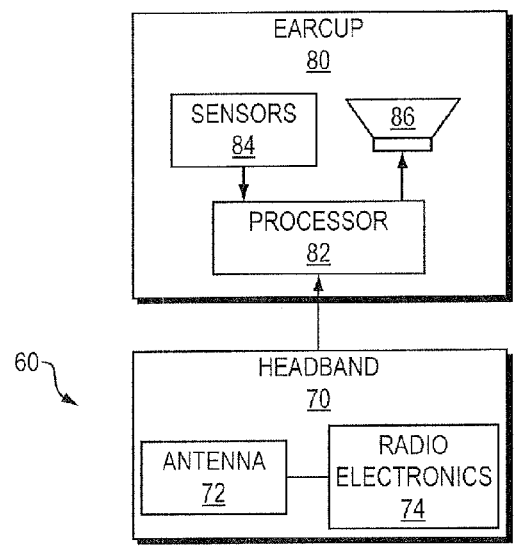
FIG. 5 is a schematic diagram of a wireless headset.

FIG. 5 is a schematic diagram of wireless headset 60. Headband 70 includes antenna 72 that is operably (electrically) coupled to radio electronics 74 that are also part of headband 70. Earcup 80 includes processor 82 that receives the audio signals, processes them as needed, and supplies them to electro-acoustic transducer 86. Sensors 84 may be microphones that detect sound and are involved in noise reduction, as is known in the art. Other sensors may be used to perform other functions associated with a headset (e.g., accelerometers or gyroscopes may be used to detect motion of the headset).

Elements of FIG. 5 are shown and described as discrete elements in a block diagram. Certain of these may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Figure 6:
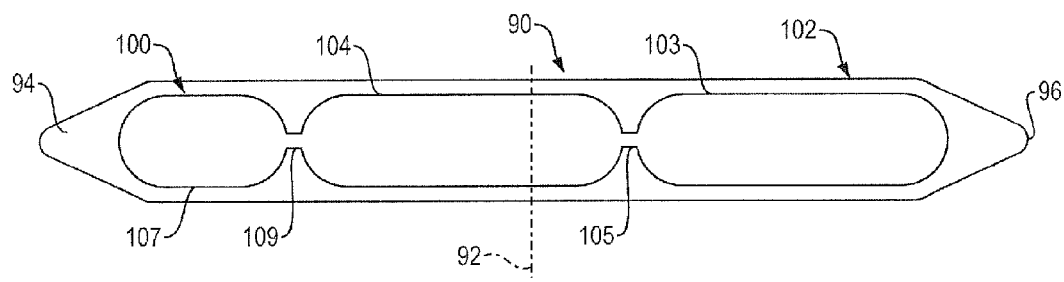
FIG. 6 is a top view of another metal support structure of the headband of a wireless headset.

The headband can include two or more distinct antennas, which may be fully or partially integral to the headband, as described elsewhere herein. The headband can have a metal support structure, and the two or more antennas can be an integral part of the metal support structure. For example, FIG. 6 illustrates headband metal support structure 90 comprising a generally flat, curved integral metal piece with ends 94 and 96, generally oval cutouts 103, 104 and 107, and central transverse bisecting axis 92. One slotted loop antenna 102 comprises cutout 103 and slot 105. A second slotted loop antenna 100 comprises cutout 107 and slot 109. As described elsewhere, one or both of antennas 100 and 102 can be of another type of antenna such as slotted antenna. Also, other antenna designs such as a monopole can use the headband's metal support structure as part of (e.g., the ground plane of), but not all of, the antenna. As non-limiting examples of antenna functionality there could be one, two or all three of a Bluetooth antenna, a 5.8 GHz Wifi antenna, and a GSM/LTE antenna, all together on the headband.

A number of implementations have been described. Nevertheless, it will be understood that additional modifications may be made without departing from the scope of the inventive concepts described herein, and, accordingly, other embodiments are within the scope of the following claims.

What is claimed is:

1. A wireless headset, comprising:
   first and second earcups, each earcup arranged to sit on, over or near one ear of the user, each earcup comprising an audio transducer; and
   a headband that is constructed and arranged to fit over a user's head, wherein the headband comprises an elongated, curved, metal support structure that is mechanically coupled to the earcups, and an antenna that comprises an opening directly in the metal support structure, where the antenna is adapted to transmit and receive wireless signals, and electronic signal processing hardware that is electrically matched to the antenna.

2. The wireless headset of claim 1, wherein the metal support structure is thin and flat, and wherein the antenna comprises a generally oval-shaped opening through the thickness of the metal support structure, and a slot in the metal support structure that is connected to the opening.

3. The wireless headset of claim 2, wherein the headband has a center located approximately equidistantly from the earcups, and wherein the opening and the slot are both entirely located between the center and one earcup.

4. The wireless headset of claim 1, wherein the electronic signal processing hardware comprises radio electronics.

5. The wireless headset of claim 1, wherein the headband comprises two distinct antennas.

6. The wireless headset of claim 5, wherein both antennas comprise an opening directly in the metal support structure.

7. The wireless headset of claim 1, wherein the antenna has a radiation efficiency, defined as total radiated power divided by total input power, and wherein the radiation efficiency of the antenna is greater than 50% when measured on a body or a proxy.

8. The wireless headset of claim 7, wherein the radiation efficiency of the antenna is about 75% when measured on a body or a proxy.

9. The wireless headset of claim 1, wherein when the headband is worn on the head the antenna has strong horizontal polarization.

10. The wireless headset of claim 9, wherein when the headband is worn on the head the antenna exhibits such a polarization, as the signal travels along a surface of the user's body, that it reduces scattering of the signal and so reduces signal attenuation in a propagating path toward ground along the sides of the user's body.

11. The wireless headset of claim 9 wherein the headband is relatively flat, and curved such that it generally follows a contour of the head across the crown of the head between the user's ears, and wherein the antenna is generally flat and generally follows the curve of the headband.

12. The wireless headset of claim 1, wherein the antenna is generally flat and generally follows a curve of the headband.

13. The wireless headset of claim 1, wherein the electronic signal processing hardware is carried by a printed circuit board.

14. The wireless headset of claim 13, wherein the antenna comprises a slotted loop structure.

15. The wireless headset of claim 14, wherein the slotted loop structure comprises a slot in the metal support structure that is connected to the opening, where the opening is generally oval shaped, where the slot has two sides, and wherein the printed circuit board is electrically matched to the metal support structure proximate each side of the slot.

16. A wireless headset, comprising:
 first and second earcups, each earcup arranged to sit on, over or near one ear of the user, each earcup comprising an audio transducer; and
 a headband that is constructed and arranged to fit over a user's head, wherein the headband comprises:
  a metal support structure that is mechanically coupled to the earcups, and an antenna that is an integral part of the metal support structure and is adapted to transmit and receive wireless signals, wherein the antenna comprises an opening directly in the metal support structure, and has a radiation efficiency, defined as total radiated power divided by total input power when measured on a body or a proxy, and wherein the radiation efficiency of the antenna is greater than 50%; and
  electronic signal processing hardware that is electrically matched to the antenna.

17. The wireless headset of claim 16, wherein the electronic signal processing hardware is carried by a printed circuit board, wherein the antenna comprises a slotted loop structure that comprises a slot in the metal support structure that is connected to the opening, where the opening is generally oval shaped, where the slot has two sides, and wherein the printed circuit board is electrically matched to the metal support structure proximate each side of the slot.

18. The wireless headset of claim 17, wherein when the headband is worn on the head the antenna has a dominant horizontal polarization and exhibits low signal attenuation in a propagating path toward ground along the sides of the user's body.

19. A wireless headset, comprising:
 a headband that is constructed and arranged to fit over a user's head, wherein the headband comprises:
  a generally flat metal support structure that generally follows a curve of the headband, and a slotted loop antenna that is an integral part of the metal support structure and comprises a loop-shaped opening directly in the metal support structure and a slot in the metal support structure that is connected to the opening, where the antenna is adapted to transmit and receive wireless signals and has a radiation efficiency, defined as total radiated power divided by total input power when measured on a body or a proxy, of greater than 50%; and
  electronic signal processing hardware that is carried by a printed circuit board that is electrically coupled to the metal support structure proximate the slot; and
 first and second earcups carried by the headband and mechanically coupled to the metal support structure, each earcup arranged to sit on, over or near one ear of the user, each earcup comprising an audio transducer;
 wherein the metal support structure extends for most of a distance between the first and second earcups.

20. The wireless headset of claim 1, wherein the metal support structure extends for most of a distance between the first and second earcups.

* * * * *